(12) United States Patent
Stieff (10) Patent No.: US 6,483,577 B2
(45) Date of Patent: *Nov. 19, 2002

(54) VEHICLE ALIGNMENT SENSOR SYSTEM (75) Inventor: Michael T. Stieff, Wentzville, MO (US)

(73) Assignee: Hunter Engineering Company, Bridgeton, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/810,357

(22) Filed: Mar. 16, 2001

(65) Prior Publication Data

US 2001/0022655 A1 Sep. 20, 2001

Related U.S. Application Data

(63) Continuation-in-part of application No. 09/184,423, filed on Nov. 2, 1998.

(51) Int. Cl.⁷ ............................ G01B 11/26; G01B 1/00; G01B 5/24
(52) U.S. Cl. ................. 356/139.09; 33/203.12
(58) Field of Search .................. 33/203.12; 356/139.09

(56) References Cited

U.S. PATENT DOCUMENTS

| | | |
|---|---|---|
| RE33,144 E | 1/1990 | Hunter et al. |
| 5,488,471 A | 1/1996 | McClenahan et al. |
| 5,488,472 A | 1/1996 | January |
| 5,535,522 A | 7/1996 | Jackson |
| 5,675,515 A | 10/1997 | January |
| 5,724,128 A | 3/1998 | January |
| 5,724,743 A | 3/1998 | Jackson |
| 5,870,315 A | 2/1999 | January |
| 5,943,783 A | 8/1999 | Jackson |

FOREIGN PATENT DOCUMENTS

| | | |
|---|---|---|
| WO | 9917133 | 4/1999 |
| WO | 0070304 | 11/2000 |

*Primary Examiner*—Stephen C. Buczinski
(74) *Attorney, Agent, or Firm*—Polster, Lieder, Woodruff & Lucchesi, L.C.

(57) ABSTRACT

A vehicle alignment sensor system includes a first sensor assembly for measuring at least a first angle with respect to a fixed reference, that angle being related in a predetermined manner to an alignment angle of a vehicle whose alignment is to be measured, and a second sensor assembly for mounting in a known geometrical relationship to a wheel of a vehicle whose alignment is to be measured. The first sensor assembly has at least one detector, and the second sensor assembly has at least a pair of emitters in fixed geometrical relationship with respect to each other. The detector is capable of measuring the apparent geometrical relationship of the pair of emitters to determine a relative alignment angle of the vehicle, so that a true alignment angle of the vehicle is determinable from the first angle and the relative alignment angle. A calibration method using the present invention is also disclosed.

25 Claims, 10 Drawing Sheets

VEHICLE ALIGNMENT SENSOR SYSTEM

CROSS-REFERENCE TO RELATED APPLICATIONS

This application is a continuation-in-part of co-pending U.S. application Ser. No. 09/184,423, filed on Nov. 2, 1998, and claims priority therefrom.

STATEMENT REGARDING FEDERALLY SPONSORED RESEARCH OR DEVELOPMENT

Not Applicable.

BACKGROUND OF THE INVENTION

This invention relates to vehicle wheel alignment system, and in particular to improved sensors in a vehicle wheel alignment system.

Proper alignment of wheels in a vehicle is important for proper handling of the vehicle and proper tire wear. The alignment of a vehicle's wheels is performed primarily by adjusting camber, caster, steering axis inclination (SAI) and toe. It is known that toe alignment angles may be measured by placing sensor heads on each wheel of the vehicle to form pairs which extend across the front of the vehicle and along each side of the vehicle. Each sensor head has an emitter and a receiver. A sensor head emits a signal which is transmitted to the receiver of the other sensor head of that pair. The receiver converts this signal into a value which is indicative of the corresponding toe alignment angle of the vehicle. Thus, wheel alignment sensors have operated using essentially similar cooperative pairs of emitter and detectors wherein a detector, mounted on one wheel, actively senses the angle of its line of sight to its corresponding emitter mounted on an adjacent wheel. In order to perform a four wheel alignment three of these cooperative pairs of sensors are required as shown in U.S. Reissue Patent No. 33,144 to Hunter et al.

The signal presently used in these sensor heads is an electromagnetic signal in the visual or infrared range (hereinafter, referred to as light). The light impinges upon a sensing device in the receiver whose output is representative of the measured angle.

Currently, photodiodes, as set forth in U.S. Pat. No. 4,302,104, which is incorporated herein by reference, and linear array type charge coupled devices (CCDs), as set forth in U.S. Pat. No. 5,018,853, are used as the receiver.

U.S. Pat. No. 4,879,670 to Colarelli describes a gravity-referenced inclinometer for use in measuring vehicle wheel alignment angles. FIG. 1A of the '670 Colarelli patent illustrates the mounting of such an inclinometer to a vehicle wheel for measuring the camber angle of the wheel. The use of gravity-referenced inclinometers to measure camber is conventional, and assumes the vehicle rests, while being measured, on a surface which is both flat and level.

Society of Automotive Engineers (SAE) Publication 850219, entitled "Steering Geometry and Caster Measurement", by January, derives and discusses the procedures and methods by which the toe angle and gravity-referenced alignment transducers are utilized to determine the caster and steering axis inclination (SAI) angles of a vehicle. The procedures described therein are the industry standard for conventional wheel alignment measurements.

Figure 1:
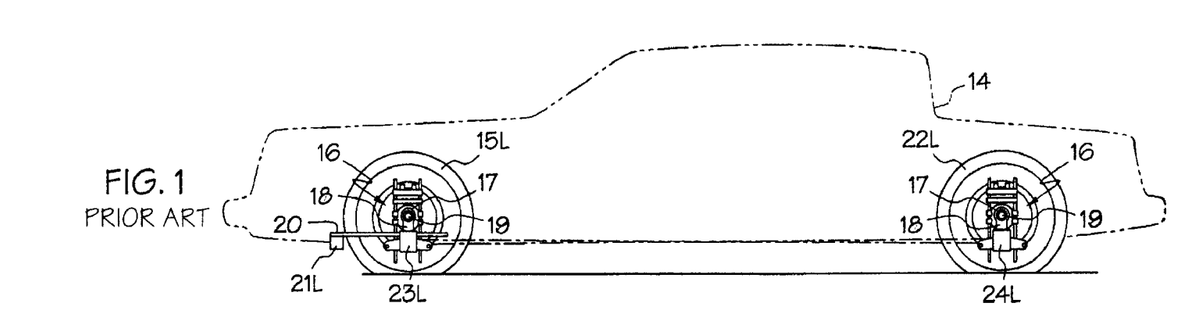
FIG. 1 is prior art illustration of a side elevational view of steerable and non-steerable wheels related to a typical vehicle shown in silhouette.
Figure 2:
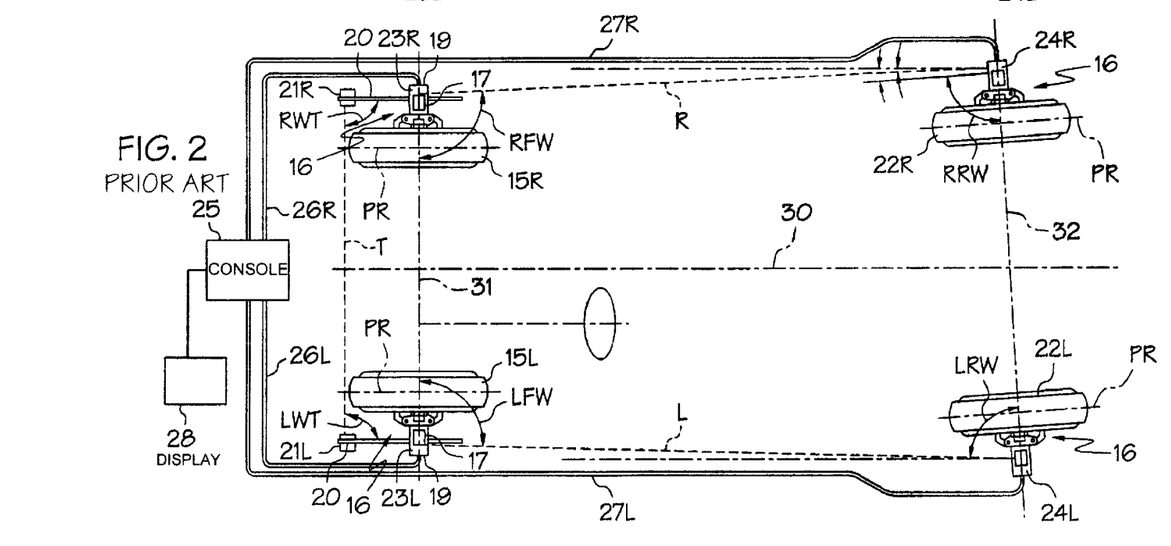
FIG. 2 is prior art a diagrammatic plan view of a representative alignment pattern for the wheels of the vehicle seen in FIG. 1.

Although the individual detector sensor assembly construction and operation can vary, a conventional prior art example is depicted in FIGS. 1–4. The view of FIG. 1 is of a passenger vehicle 14 which will serve to illustrate the utility of the presently preferred embodiment of the invention. As seen from the left side, the left steerable wheel 15L is shown in association with one form of an instrument support 16 adapted to grip the flange of the wheel rim. The support 16 carries a pivotal housing 17 the axis of which is substantially centerable to the spindle axis (not shown) on which the wheel 15L rotates. A bracket 18 is hung from the housing 17 so it may assume a substantially vertical position even though the wheel 15L is jacked up so it may rotate. At times, with the wheel 15L resting on its support, it may be desirable to secure the bracket 18 against pendulous movement by tightening up on a knob 19 (FIG. 2). The bracket 18, in addition to the housing 17, carries a support arm 20 which extends forwardly of the housing 18 to clear the tread of wheel 15L and be in position so that its end portion may be used for supporting an instrument device 21L. The support arm 20, or some associated part of the assembly, is usually provided with a spirit level (not shown) for purposes of locating the sensor assembly in a known orientation, which is retained by tightening up on the knob 19.

Further shown in FIG. 1 is the vehicle non-steerable wheel 22L to be provided with an instrument support 16 which is identical to the support attached to the steerable wheel 15L. The several parts are designated by similar reference numerals and need not be described again. It is particularly important to observe that the support 16 at the left steerable wheel 15L carries an instrument 23L and the support 16 for the left non-steerable wheel 22L carries a companion instrument 24L. These instruments 23L and 24L are made up of cooperating components which are intended to function with each other in a manner set forth in U.S. Pat. No. 4,19,838 to Grossman, et al.

FIG. 2 shows a schematic plan view of all vehicle wheels, such as those at the left side seen in FIG. 1, and companion right side wheels 15R and 22R. The wheels at the left side are distinguished by adding the suffix "L", and those at the right side are distinguished by the suffix "R". However, each wheel 15R and 22R is provided with an instrument support 16 having the construction generally described above. Also, the support 16 on steerable wheel 15R has a support arm 20 which carries an instrument 21R to cooperate with the left side instrument 21L. In addition, the support 16 at the non-steerable wheel 22R carries an instrument 24R to cooperate with an instrument 23R carried by the support 16 at the steerable wheel 15R. These instruments 21L and 21R, as well as instruments 23R and 24R, cooperate with each other and are made up of components operating in a manner described in the '838 Grossman et al. patent.

In view of FIG. 2, the instruments 21L and 23L are in communication into a console assembly 25, such as by cables 26L and 26R, or by a conventional wireless communications system, and in like manner, the instruments 24L and 24R are in communication with console 25. Signal processing and alignment computation are performed in the console 25 and the results can be displayed by means indicated collectively at 28. More particularly in FIG. 2, the instruments 21L and 21R cooperate with each other in the process of measuring the angles LWT (left wheel toe) and RWT (right wheel toe). For that purpose instrument 21L has radiant energy detector means which is responsive to a source of radiant energy from instrument 21R, and instrument 21R has radiant energy detector means responsive to a source of radiant energy from instrument 21L. The essence of this cooperation is that projectors of radiant energy are disposed to direct beams in criss-cross paths transversely of the vehicle, and which paths have boundaries within the field of vision of the detector means arranged to look at the position from which the beam is projected.

In a like manner, it is indicated in FIG. 2 that instruments 23L and 24L, each containing radiant energy beam projectors and radiant energy detectors, cooperate with each other in the process of measuring the respective angles relative to a vehicle reference axis 30 which is established by a line joining the center points of the axles 31 and 32, which center points are centered between the spacing of the wheel sets 15L and 15R, and 22L and 22R. The angle LFW is formed between the axle 31 and the longitudinal line-of-sight L of the radiant energy beam from the instrument 24L at wheel 22L. The angle LRW is formed between the axle 32 and the longitudinal line-of-sight L of the radiant energy beam from the instrument 23L at wheel 15L. Similarly, the instruments 23R and 24R cooperate with each other for measuring the angles RFW and RRW by the criss-crossing of the radiant energy beams depicted by the dash line R representing the longitudinal line-of-sight between the detector means in the instruments 23R and 24R. In the example seen in FIG. 2, the wheels 15L and 15R have planes of rotation PR which are substantially perpendicular to the axle 31, while the planes of rotation PR of the wheels 22L and 22R are also substantially perpendicular to axis 33. This arrangement shows that the angles LWT and RWT are substantially ninety degrees (90°) since it is presumed that the instrument support arms 20 are substantially parallel to the planes of rotation PR for wheels 15L and 15R. However, it is shown in FIG. 2 that the tread spacing for wheels 22L and 22R is greater than for the tread spacing of the wheels 15L and 15R. In addition, wheel 22L is toed out relative to the reference axis 30 while wheel 22R is toed in relative to the same axis 30. The angular positions for the respective wheels 15L, 15R, 22L and 22R are arbitrary for purposes of illustrating the unique advantages of having active instruments at each wheel for measuring wheel position angles from each other and relative to the reference axis 30 for the vehicle.

Figure 3:
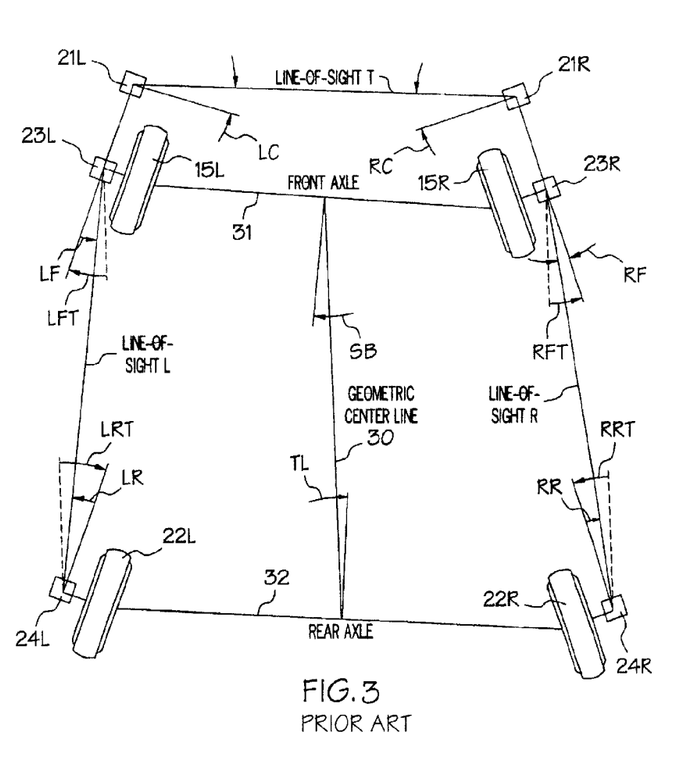
FIG. 3 is a prior art diagrammatic layout of the vehicle wheels for the purpose of illustrating the measurement of the angles of the respective wheels relative to a geometric center line.

FIG. 3 is a diagrammatic view of the wheels 15L, 15R, 22L and 22R of the vehicle 14 of FIGS. 1 and 2, but in this view the wheels have been intentionally mis-aligned to illustrate the geometry of wheel alignment investigation using the foregoing principle instrumentation. The instruments are generally shown and designated by the reference characters appearing in FIG. 2, and the alignment is calculated with reference to a geometric center line 30 (FIG. 2) of the vehicle. It is necessary to understand that there is a line-of-sight T between the instruments 21L and 21R which represents the radiant energy beam path from the respective instruments 21L and 21R. The line-of-sight may not be the center of the beam, but the beam has a sufficient spread or fan to be seen by the opposing beam sensors. Normally the wheels will not be so far out of alignment as is depicted in FIG. 3 that the beam will not be seen. In like manner there is a line-of-sight L between the instruments 23L and 24L representing the radiant energy beam path from the respective instruments 23L and 24L. The line-of-sight R between the instruments 23R and 24R depicts the path of the radiant energy beams from those respective instruments. There are construction lines on the drawing of FIG. 4 to assist in visualizing the angles to be investigated, such as the dash lines which are parallel to the geometric center line 30, and act as a reference for the angles.

The angles indicated in FIG. 3 are shown in tabular form with reference to the position of the beam projectors, and beam sensors used to determine those angles.

| EMITTER LOCATION | DETECTOR LOCATION | MEASURED ANGLE |
|---|---|---|
| Right front toe arm | Left front toe arm | Left cross LC |
| Left front toe arm | Right front toe arm | Right cross RC |
| Left rear wheel | Left front wheel | Left front longitudinal LF |
| Right rear wheel | Right front wheel | Right front longitudinal RF |
| Left front wheel | Left rear wheel | Left rear longitudinal LR |
| Right front wheel | Right rear wheel | Right rear longitudinal RR |

The following computations relative to the geometric reference line 30 are worked out for the several angles pertinent to the alignment determination, as follows:

| ANGLES COMPUTED | ALGORITHM |
|---|---|
| LFT (left front toe) | ½(LC + RC + LF − RF) |
| RFT (right front toe) | ½(LC + RC − LF + RF) |
| TFT (total front toe) | LFT + RFT = LC + RC |
| SB (set back) | ½(RC − LC + LF − RF) |
| LRT (left rear toe) | LFT − LF + LR = (LC + RC − LF − RF) + LR |
| RRT (right rear toe) | RFT − RF + RR = ½(LC + RC − LF − RF) + RR |
| TRT (total rear toe) | LRT + RRT = LC + RC − LF − RF + LR + RR |
| TL (thrust line) | ½(LRT − RRT) = ½(LR − RR) |
| LFTTH (left front toe relative to thrust line) | LFT − TL |
| RETTH (right front toe relative to thrust line) | RFT + TL |

Figure 4A:
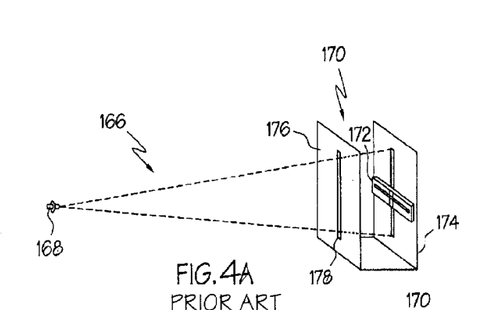
FIG. 4A is a perspective view of a prior art angle sensor.
Figure 4B:
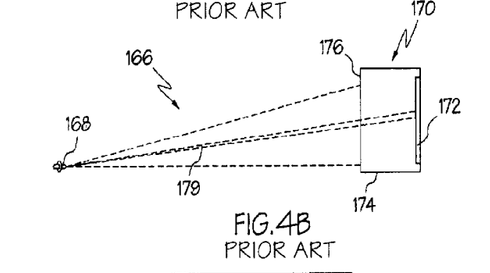
FIG. 4B is a plan view of the prior art angle sensor of FIG. 4A.

FIGS. 4A and 4B are perspective and top views, respectively, illustrating a prior art linear CCD angle detector 166 which may be utilized with the present invention. Sensor 166 comprises light source 168 and optical bench 170. Radiation source 168 is coupled to one head unit, 118L for example, and optical bench 170 is mounted to another 155 head unit, 18R for example.

Figure 5:
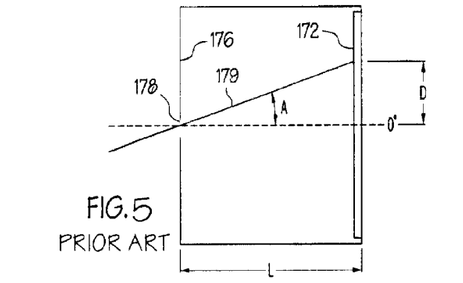
FIG. 5 is a diagram which shows the angle of light in entering the prior art angle sensor of FIGS. 4A and 4B.

Optical bench 170 includes linear CCD 172 and frame 174. Frame 174 includes a mask 176 which defines a slit 178. Slit 178 may comprise a cylindrical lens, and a filter (not shown) may be placed in front of CCD 172 to reduce interference from stray light sources. Slit 178 is at a right angle to linear CCD 172, allowing a portion of the light from light source 168 to fall upon linear CCD 172. The remaining portion of the light from light source 168 directed at linear CCD 172 is blocked by mask 176. As seen in FIG. 5, the angle A at which the light passing through the slit 178 deviates from an axis perpendicular to the CCD 172 corresponds to a distance D along the CCD 172 at which the light will be detected, and accordingly, can be calculated through conventional algorithms once the point of illumination on the CCD 172 is known, yielding the relationship between the light source 1687 and the CCD 172. A suitable linear CCD 172 is TCD 102D available through Toshiba, 7300 Metro Boulevard, Edina, Minn. 55435.

FIG. 4A shows the relationship between light source 168 and optical bench 170 at an angle of 0 degrees. FIG. 4B shows the relationship of light source 168 and optical bench 170 when light source 168 is not in alignment with optical bench 170.

Typically, six angle sensors 166 in the horizontal plane are used to measure the toe alignment of the wheels of an automotive vehicle. Angle sensor 166 can use infrared or visible light sensors and sources. The multi-element linear CCD 172 comprises a row of 2048 pixels and is used to sense light from light source 168. Slit 178 and mask 176 allow only a portion of the 2,048 pixels to be illuminated by light source 168. Typically, the image will illuminate about 20 to 22 pixel elements of linear CCD 172. However, the width of the image projected on linear CCD 172 may range from about 2 pixel elements to about 80 pixel elements.

As optical bench 170 is rotated and the angle between optical bench 170 and light source 168 is changed, the line of light 179 admitted by slit 178 moves across the pixels of linear CCD 172. At zero degrees, pixel elements near the center of linear CCD 172 are illuminated. As the bench is rotated, elements farther from the center of the sensor are illuminated. The angle of rotation A is found by determining which of the pixel elements of linear CCD 172 are illuminated and calculating how far the angle is from zero degrees, as is seen in FIG. 5.

Slit length determines the range of the allowed tilt of the sensor in an axis perpendicular to the axis of measurement (allowed camber angle) while measuring toe or allowed pitch angle while measuring toe with track sensors. A range of plus or minus 12 degrees is obtained by making the length of slit 178 about equal to the length of linear CCD 172. This should be sufficient for most alignment needs. If the distance between slit 178 and linear CCD 172 is changed from 2⅝ inches, the length of slit 178 should also be changed to maintain a range of plus or minus 12 degrees. For example, if the distance between slit 178 and linear CCD 172 is doubled, the length of slit 178 must also be doubled.

The purpose of linear CCD 172 is to convert light energy from light source 168 into electrical energy and provide an output representing an image. Linear CCD 172 uses a linear array of about 2,048 photo-sensitive cells (pixels) which collect light for a controlled period of time (the exposure time), and provide a serial output of data from the pixels. This output is essentially a "snapshot" or "picture" of the scene to which linear CCD 172 was exposed. An algorithm is employed to locate the image of the slit which falls on linear CCD 172 due to light source 168 and the angular relationship between light source 168 and optical bench 170 is calculated.

Alternative prior art angle detectors employing pairs of emitters and a single linear CCD sensor, such as are shown in FIG. 12 of U.S. Pat. No. 5,488,471 to McClenahan et al., herein incorporated by reference, may be utilized with the present invention.

Equipment of this general type and using the apparatus and methods enumerated above has been used world-wide for many years. Such equipment is capable of determining the camber, caster, and pointing or "toe" alignment angles of the wheels relative to one or more appropriate reference axes, and is sufficient to allow proper adjustment of the alignment so as to reduce tire wear and provide for safe handling.

Presently available sensors work well, but they could be improved in terms of both cost and reliability. Moreover, checking the calibration of presently available systems is not a particularly accurate process. Such calibration checks are particularly unsuited for checking camber calibration and even for toe calibration those checks do not typically identify the sensor transducer which may be out of calibration.

BRIEF SUMMARY OF THE INVENTION

Among the various objects and features of the present invention may be noted the provision of an improved sensor system for detecting alignment and suspension measurements.

A second object is to provide such a sensor system which will accurately determine vehicle wheel alignment and steering angles.

A third object is to provide such a sensor system which provides easy and accurate calibration checks for both camber and toe.

These and other objects will become apparent to those skilled in the art in light of the following disclosure and accompanying drawings.

Briefly, in a first aspect of the present invention, a vehicle alignment sensor system includes a first sensor assembly and a second sensor assembly for mounting in a known geometrical relationship to a wheel of a vehicle whose alignment is to be measured. The first sensor assembly having at least one detector, and the second sensor assembly has at least a pair of emitters in fixed geometrical relationship with respect to each other, and wherein the detector is capable of measuring the geometrical relationship of the pair of emitters to determine a toe alignment angle of the vehicle.

In a second aspect of the present invention, a vehicle alignment sensor system includes a first sensor assembly and a second sensor assembly for mounting in a known geometrical relationship to a wheel of a vehicle whose alignment is to be measured. The first sensor assembly having at least one detector, and the second sensor assembly has at least a pair of emitters in fixed geometrical relationship with respect to each other, and wherein the detector is capable of measuring the geometrical relationship of the pair of emitters to determine a camber alignment angle of the vehicle.

In a third aspect of the present invention a method of determining vehicle alignment angles includes the steps of measuring at a first wheel least a first camber angle with respect to a fixed reference, mounting at least a pair of emitters in fixed geometrical relationship with respect to each other on a second wheel of the vehicle whose alignment is to be measured, measuring the apparent geometrical relationship of said pair of emitters to determine a relative camber alignment angle of the second wheel vehicle, and determining a true camber alignment angle of the second wheel of the vehicle from said first camber angle and from said relative camber angle.

In a fourth aspect of the present invention, a method of checking calibration in an apparatus for determining camber of vehicle wheels includes the steps of disposing first, second, third, and fourth sensor assemblies in a fixed geometrical relationship with first, second, third, and fourth wheels of a vehicle, respectively, said sensor assemblies each having gravity-referenced inclinometers for determining camber angles of said wheels, determining the camber angles of said wheels from said gravity-referenced inclinometers, disposing in a fixed geometrical relationship with respect to at least one of the wheels of a vehicle a pair of emitters in a generally first orientation and an additional emitter generally at a known orientation to said pair of emitters, determining a relative camber angle for said wheel using said pair of emitters and additional emitter, converting the relative camber angle to a true camber angle, and determining if at least one of said sensors assemblies is properly calibrated by comparing the true camber angle derived from the pair of emitters and the additional emitter from the camber angle for the corresponding wheel obtained from the corresponding gravity-referenced inclinometer.

In a fifth aspect of the present invention, a method of checking calibration in an apparatus for determining toe of vehicle wheels includes the steps of disposing at least first and second sensor assemblies in a fixed geometrical relationship with first and second wheels of a vehicle, respectively, said sensor assemblies each having at least a first detector and a first emitter operating in pairs for determining true toe angles of said wheels, determining the first toe angles of said wheels from said first detectors and said first emitter pairs, disposing in a fixed geometrical relationship with respect to at least one of the wheels of a vehicle a pair of emitters in a generally first orientation, determining a second toe angle of one of said wheels with respect to another of said wheels using said pair of emitters, comparing the first toe angle to the second toe angle, and determining if at least one of said sensor assemblies is properly calibrated.

BRIEF DESCRIPTION OF THE SEVERAL VIEWS OF THE DRAWINGS

Similar reference characters indicate similar parts throughout the several views of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention. Reference will now be directed to the drawings for a more complete understanding of the intent and scope of the invention presented in terms of an embodiment presently preferred.

The vehicle wheel alignment system of the present invention will be first described generally, with reference to FIGS. 6–10, and subsequently in detail, again referring to FIGS. 6–10 as well as to additional FIGS. 11–14C.

Like the traditional vehicle alignment systems, the system of the present invention also uses three pairs of sensors. However, in this system, some or all of the active pairs of sensors are replaced by a pair (or pairs) consisting of one active and one passive sensor. An example of this type of active/passive sensor pair is illustrated in FIG. 6.

Figure 6:
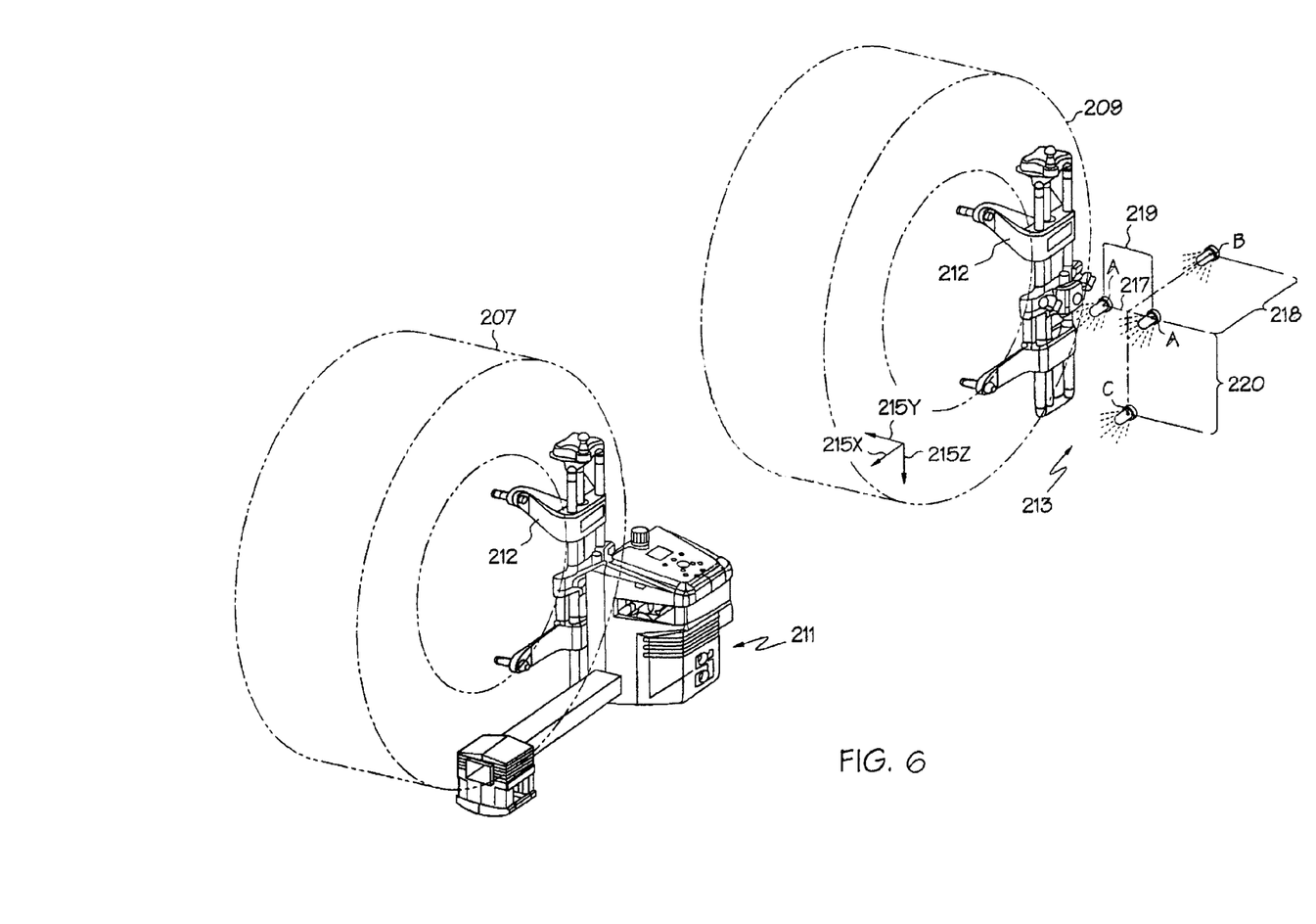
FIG. 6 is a perspective view of a sensor system of the present invention, showing front and rear sensor assemblies for one side of a vehicle, with emitter placement shown in simplified schematic form.

FIG. 6 shows a conventional wheel alignment sensor assembly 211 (in this case a front sensor such as that sold by the present assignee under the trade designation DSP300) mounted to a front wheel 207 of a vehicle to be aligned, and a passive sensor 213 consisting of multiple emitters (at least two) mounted to the adjacent rear wheel 209. The multiple emitters are discussed below. In this system, the longitudinal toe values for the front sensor assembly 211 (the angle between the longitudinal axis of this sensor and its line of sight to its corresponding pair of emitters—"A"—"A" in FIG. 6—mounted in the rear sensor assembly 213) are measured in the same way that they would be in conventional systems, such as that sold under the trade designation DSP300 by the assignee of the present invention. It should be understood that similar front and rear sensor assemblies would be used for the other side of the vehicle. It should also be understood that the various sensor assemblies could be connected to a separate console for computing the alignment angles in the manner discussed below from the various measurements, or the computation could take place in one or more of the sensor assemblies themselves.

Figure 7:
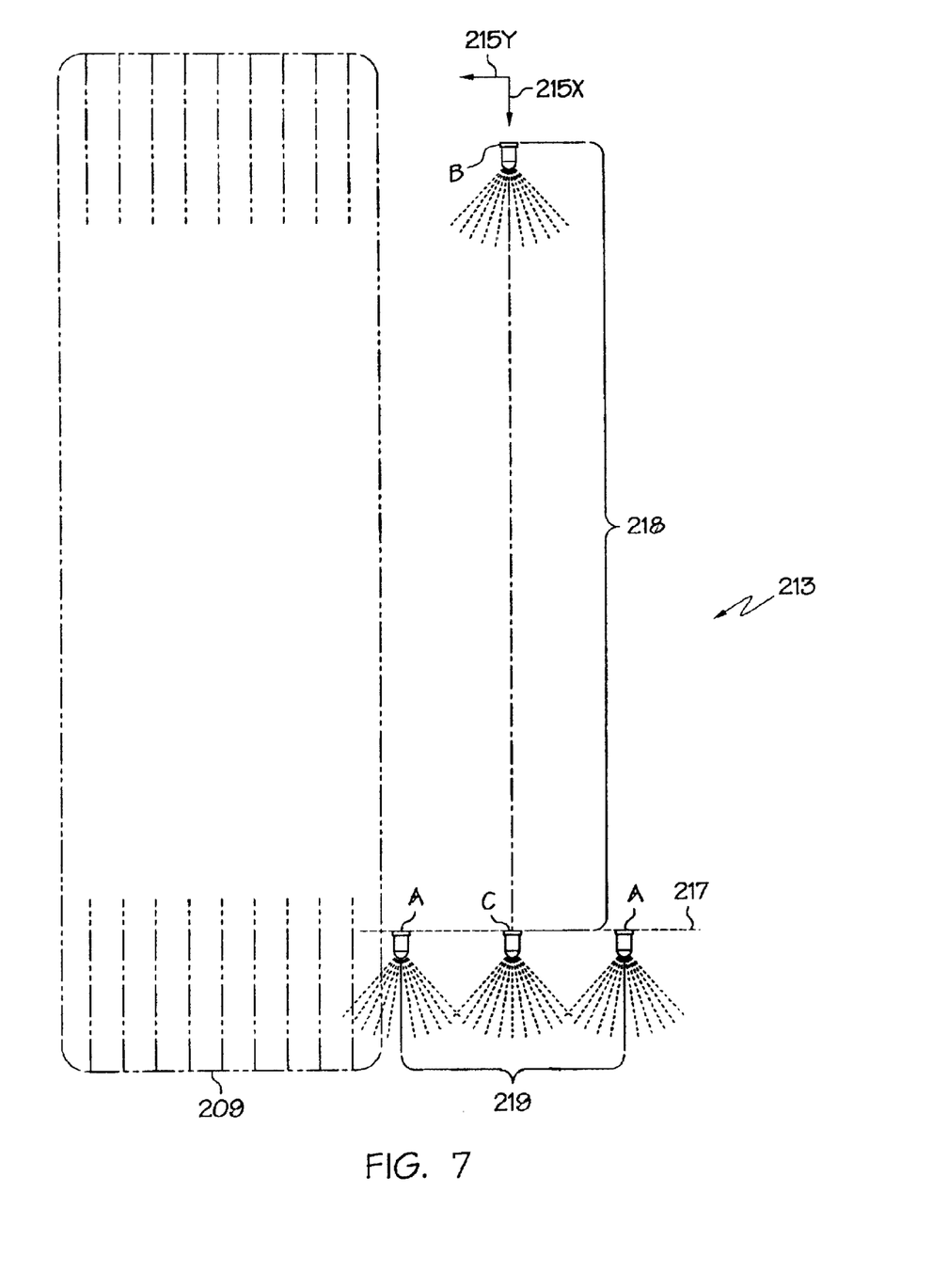
FIG. 7 is a simplified schematic top view showing the emitter configuration of FIG. 6.

Rear longitudinal toe is measured with the present invention in a different manner from that conventionally used. Longitudinal toe measurement for the rear sensor assembly 213 is the angle between the rear sensors longitudinal axis 218 and the front sensor's line of sight through a point halfway between the pair of emitters "A"—"A" and a third emitter "B" which is placed in known, fixed geometric relation to pair "A". As shown in FIG. 7, the "A"—"A" emitters are disposed along one line 217 while emitter "B" is disposed substantially behind that line. For example, the "A"—"A" emitters can be approximately 3" apart, while the "B emitter can be spaced roughly 10" behind the "A"—"A" emitters.

By comparison of the lines of sight that the front sensor has to emitters "A"—"A" and "B" and knowing the geometric relationship of these same emitters to the longitudinal axis 218 of the rear sensor 213, one can determine rear longitudinal toe. Once the front and rear longitudinal toe values have been determined, total four wheel toe alignment geometry of the vehicle can be determined with the addition of transverse toe values which can be obtained in a similar manner, or even in the conventional manner.

The discussion to this point has been limited to determination of toe angles. Another aspect of this system of the present invention is the ability to measure relative camber between two adjacent sensor assemblies. Again referring to FIG. 6, the front sensor assembly 211 determines a line of sight to a point halfway between emitters "A"—"A". It also determines the line of sight to emitter "C" which is disposed vertically a known amount (e.g., 8") from the point halfway between emitters "A"—"A". Since the toe measurement device is only capable of measuring angles in its horizontal plane, it is oblivious to the vertical displacement. However, knowing the relative horizontal positions of emitters "A"—"A" and "C" and knowing the geometric relationship of these emitters to the rear sensor assembly's vertical axis, the sensor system can determine the relative camber of the rear sensor to the front sensor. Knowing this relative value, it can then be compared to the front sensors' camber (which has already been measured by conventional means) and the true camber value of the rear sensors determined.

Many variations on this scheme could be used. For example, the passive and active transducers could be switched between sensors. Additional sensors could be added that sense vertical positions of the emitters mounted to an opposed sensor resulting in the ability to check sensor level and caster adjust, or measure SAI.

It has been found that measuring toe angles in the previously described manner allows an inexpensive way of verifying calibration of traditional systems by providing redundant measurements. In such a system, each sensor assembly includes not only the traditional means of measuring toe and camber, but also the passive means disclosed and discussed above. The traditional measurements and the active I passive measurements discussed above can be compared to determine not only whether the total system of four sensor assemblies is in calibration, but also to determine which sensor assembly, if any, is out of calibration. In addition, these calibration checks are able to check both toe and camber calibration, which is not the case with many prior calibration systems. Camber measurements made in the above-described manner could also provide a method of verifying camber measurements made by conventional means. Averaging redundant measurements could result in more fault tolerant systems.

Figure 9:
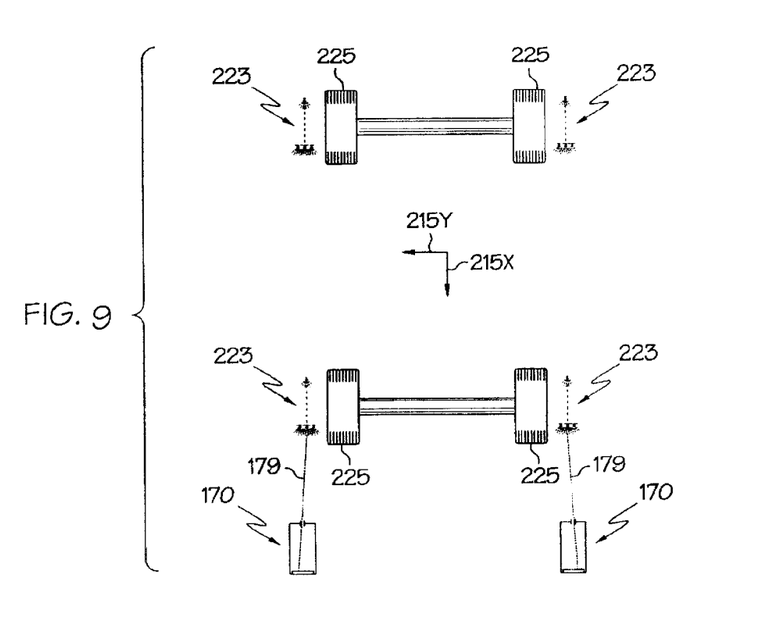
FIG. 9 is a block diagram view illustrating a first alternative embodiment of the system of FIG. 6.
Figure 10:
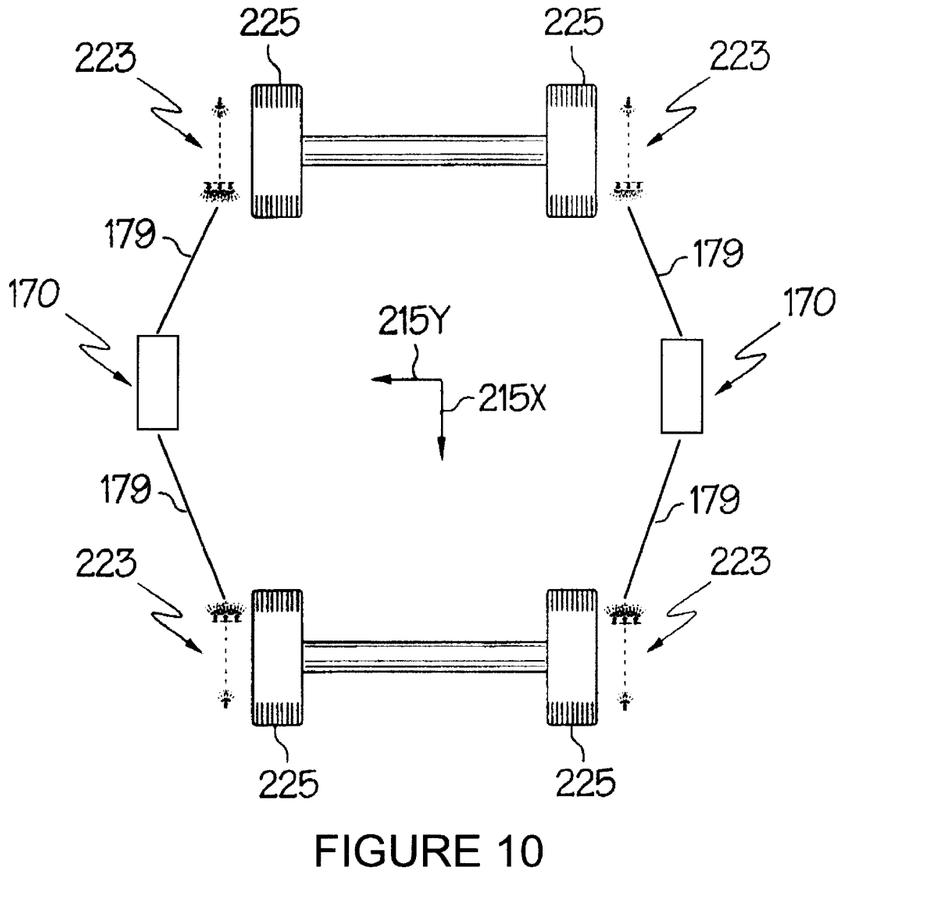
FIG. 10 is a block diagram view illustrating a second alternative embodiment of the system of FIG. 6.

Turning to FIGS. 9 and 10, it can be seen that the present system can also function where the angle measuring (active) device (labeled 170 in this case) is not mounted to the wheels of the vehicle but is instead mounted adjacent to it. An array of emitters 223 would then be mounted to each wheel 225 and the positions and orientations of the wheels determined. Using one vertically sensing and one horizontally sensing transducer on both the left and right side of the vehicle, all traditional wheel alignment measurements could be made.

Passive sensors of the sort described above could be used for determining frame angle and providing frame reference when performing truck alignment. Although it is contemplated that LED and laser diode emitters and/or CCD detectors would be used in the present system, they could be replaced by other devices serving the same purposes, e.g. retro-reflectors and dual diode toe transducers.

The position and number of emitters used to make the toe measurements is not critical except that there must be at least two emitters and the relative positions of the emitters known (or discernible) and positioned such that they provide adequate movement to provide suitable measurements. The same holds true for camber measurements.

Returning to FIG. 6, those of ordinary skill in the art will readily recognized that a variety of support structures may be utilized provided the lines of sight between the emitters and the detector, herein located in the sensor assembly 211 on the front wheel 207, are not blocked.

In this system, the longitudinal toe value for the front sensor assembly 211 (the angle LF in FIG. 3, between the longitudinal axis of sensor 211 and the line of sight to the corresponding pair of emitters A—A shown in FIG. 6, mounted in the rear sensor assembly 213) is measured in the same way that they would be in conventional systems, i.e. at the front sensor assembly 211 by a linear CCD or optical sensor, such as is described in U.S. Pat. No. 5,488,471 to McClenahan et al. However, the longitudinal toe value for the rear sensor assembly 213 (the angle LR in FIG. 3, between the longitudinal axis of the sensor 213 and the line of sight to the corresponding detector in sensor assembly 211) is also measured at the front sensor assembly 211. The following chart illustrates the angles indicated in FIG. 3 in tabular form with reference to the position of the emitters, and detectors of the preferred embodiment of the present invention used to determine those angles:

| EMITTER LOCATION | DETECTOR LOCATION | MEASURED ANGLE |
|---|---|---|
| Right front toe arm | Left front toe arm | Left cross LC |
| Left front toe arm | Right front toe arm | Right cross RC |
| Left rear wheel | Left front wheel | Left front longitudinal LF |
| Right rear wheel | Right front wheel | Right front longitudinal RF |
| Left REAR wheel* | Left FRONT wheel* | Left rear longitudinal LR |
| Right REAR wheel* | Right FRONT wheel* | Right rear longitudinal RR |

*Denotes changes from the conventional prior art system described above.

It should be understood that similar front and rear sensor assemblies 211 and 213 are preferably used for the opposite (right) side of the vehicle to obtain the corresponding measurements. It should also be understood that the various sensor assemblies could be in communication with a separate console for computing the alignment angles in the manner discussed below from the various measurements, or the computation could take place in one or more of the sensor assemblies themselves. These computations would be carried out by in the manner previously detailed, whether within the sensors or otherwise.

In order to provide an orientation for the following spatial descriptions and related mathematical computations, a Euclidean coordinate system 215 is defined. The coordinate axes 215x, 215y, and 215z are on the longitudinal (front-to-back), transverse (side-to-side), and vertical directions, respectively, of a vehicle to be aligned. Coordinate system 215 point of origin is shown in FIG. 6 at a position along a line connecting the sensor assemblies 211 and 213 and behind the sensor assembly 213 in the negative 215x direction. Absolute distances along the various axes 215 from the point of origin are arbitrary, since only relative distances are of consequence to the present invention. Accordingly, in various figures, the point of origin is depicted in differing locations. The directions of the coordinate axes 215, however, are significant, and these axes provide a reference orientation throughout the drawings.

As stated above, the rear longitudinal toe (angles LR and/or RR in FIG. 3) is measured with the present invention in a fundamentally different manner from that conventionally used in prior art wheel alignment systems. The longitudinal toe measurement of rear wheel 209 is determined by the front sensor assembly 211, from measurements of the light from the emitter pair A—A and emitter B of the rear sensor assembly 213. The front sensor assembly 211 determines the line of sight of radiation it detects from the emitters pair A—A, using the conventional linear CCD angle detector described above for determining the longitudinal toe measurement of the front wheel 207. A detailed description of the operating principles of such a conventional dual emitter—single linear CCD angle detector combination may be found in U.S. Pat. No. 5,488,471 to McClenahan et al. Such conventional linear CCD angle detectors are fundamentally different from the optical detector arrays utilized by imaging vehicle wheel alignment systems, such as set forth in U.S. Pat. No. 5,675,515 to January. Imaging vehicle wheel alignment systems form a two dimensional image of an observed target mounted to a vehicle wheel, and compute alignment parameters from features of the observed target present in the two dimensional image. In contrast, the linear CCD angle detectors utilized by the present invention do not form an image of the emitters on the sensor assembly 213, but merely, as described below and shown in FIGS. 4A, 4B, and 5, observe apparent horizontal separation distances. No image of the emitters is formed.

As shown in FIG. 7, the pair A—A emitters are disposed along dotted line 217 while emitter B is disposed a separation 218 behind line 217. In FIG. 7, the view is along the axis 215z (top), with the axes 215y and 215z disposed as shown. The pair A—A emitters are a separation 219 apart. The B emitter is preferably disposed behind the midpoint between the emitters A along line 217 (when forward—the direction parallel to 215x—is the direction of the emitted light).

Figure 8:
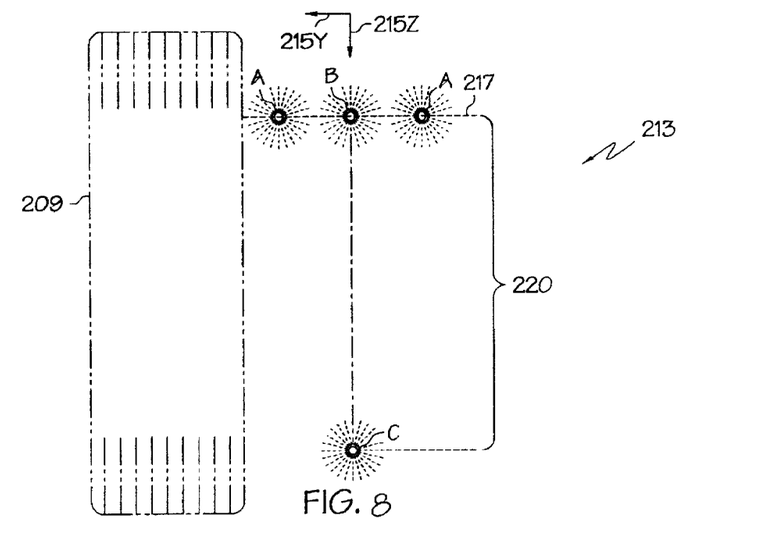
FIG. 8 is a simplified schematic plan view along the detector's line of sight showing the emitter configuration of FIG. 6.

As shown in FIG. 8, the C emitter is disposed a separation 220 below line 217. In FIG. 8, the view is along the axis 215x (front), with the axes 215y and 215z disposed as shown. In this view point. The light from the emitters is directed out of the plane of FIG. 8, and towards the viewer. The C emitter is preferably disposed below—in the direction 215z—the midpoint between the emitters A—A along line 217. For example, separation 220 can be approximately 8.0 inches. In both FIGS. 11 and 12 described below, the view is from the direction 215z (top) with the axes 215x and 215y disposed as depicted. Similarly, in FIGS. 13A–14C, described below, the view is from the same position as seen in FIG. 8.

Figures 13A, 13B, 13C:
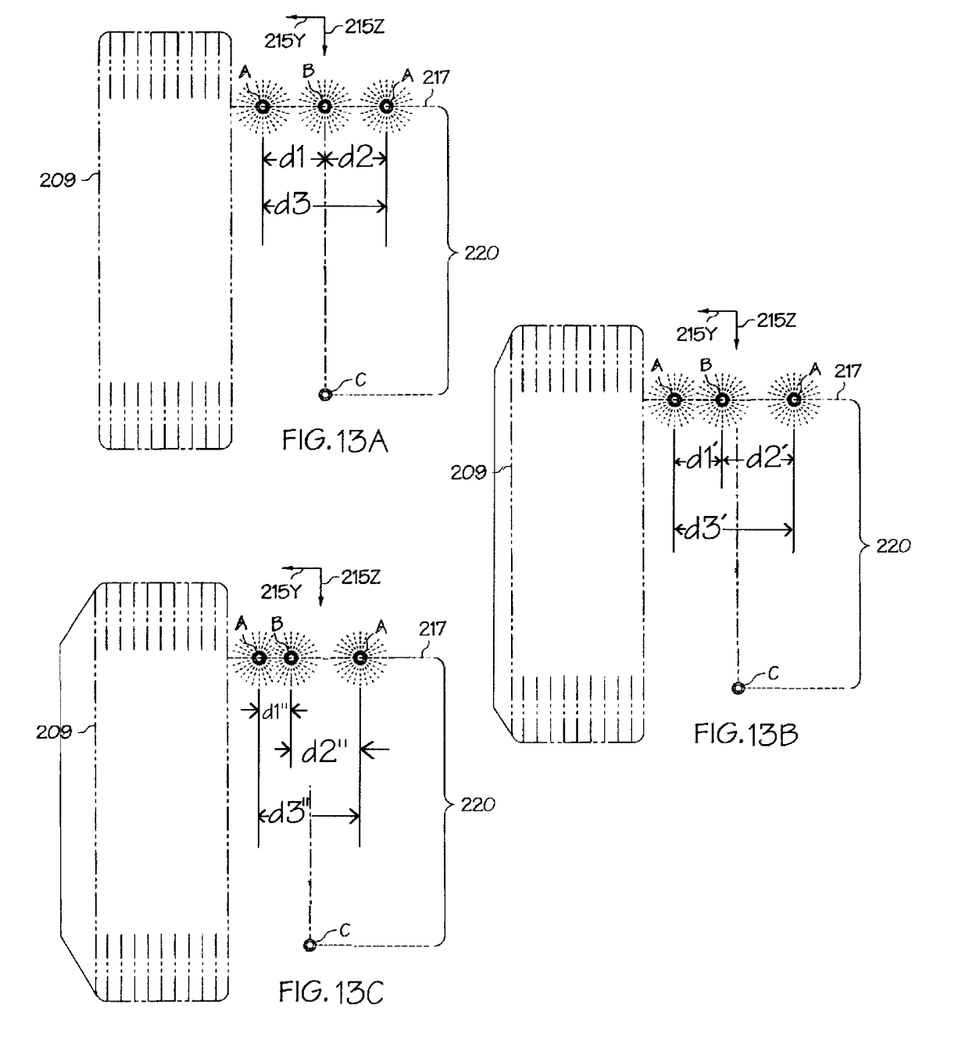
FIGS. 13A through 13C are views similar to FIG. 8, which illustrate the apparent displacement of the emitters as seen along a detector's line of sight at different toe angles for the wheel to which the emitters are mounted.

Referring to FIGS. 11 and 13A through 13C, a detector, such as optical bench 170 with slit 178, has line of sight 232 to emitter B and lines of sight 234 and 236 to emitters pair A—A. As seen in FIG. 13A, when viewed head-on, i.e. along the along the longitudinal axis of sensor assembly 213, the apparent horizontal distance between the left emitter A and emitter B is identified as d1 and is equal to the distance between the right emitter A and emitter B, which is identified as d2. The apparent horizontal separation distance between emitters A—A is identified as d3. Each of these apparent horizontal separation distances is observed in the preferred embodiment using the detector located on the front sensor assembly 211.

FIGS. 13B and 13C represent the observed positions of the emitters A—A, B, and C for two different exaggerated longitudinal toe orientations of tire 209, as seen from the position of the front sensor assembly 211, mounted on the front tire 207. Apparent separation distances between corresponding emitters are denoted as d1'–d3' and d1"–d3". As can be clearly seen, each of the apparent distances changes in a mathematical relation to the observation angle. Specifically, the ratio of apparent distances d1 and d2 to the apparent distance d3 changes in proportion to the observation angle 240A. By utilizing these observed apparent distances, and the known emitter spatial configuration, i.e. the actual horizontal separation distances between the emitters, the angle of observation 240A can be computed using any of a variety of standard trigonometric techniques.

Figure 11:
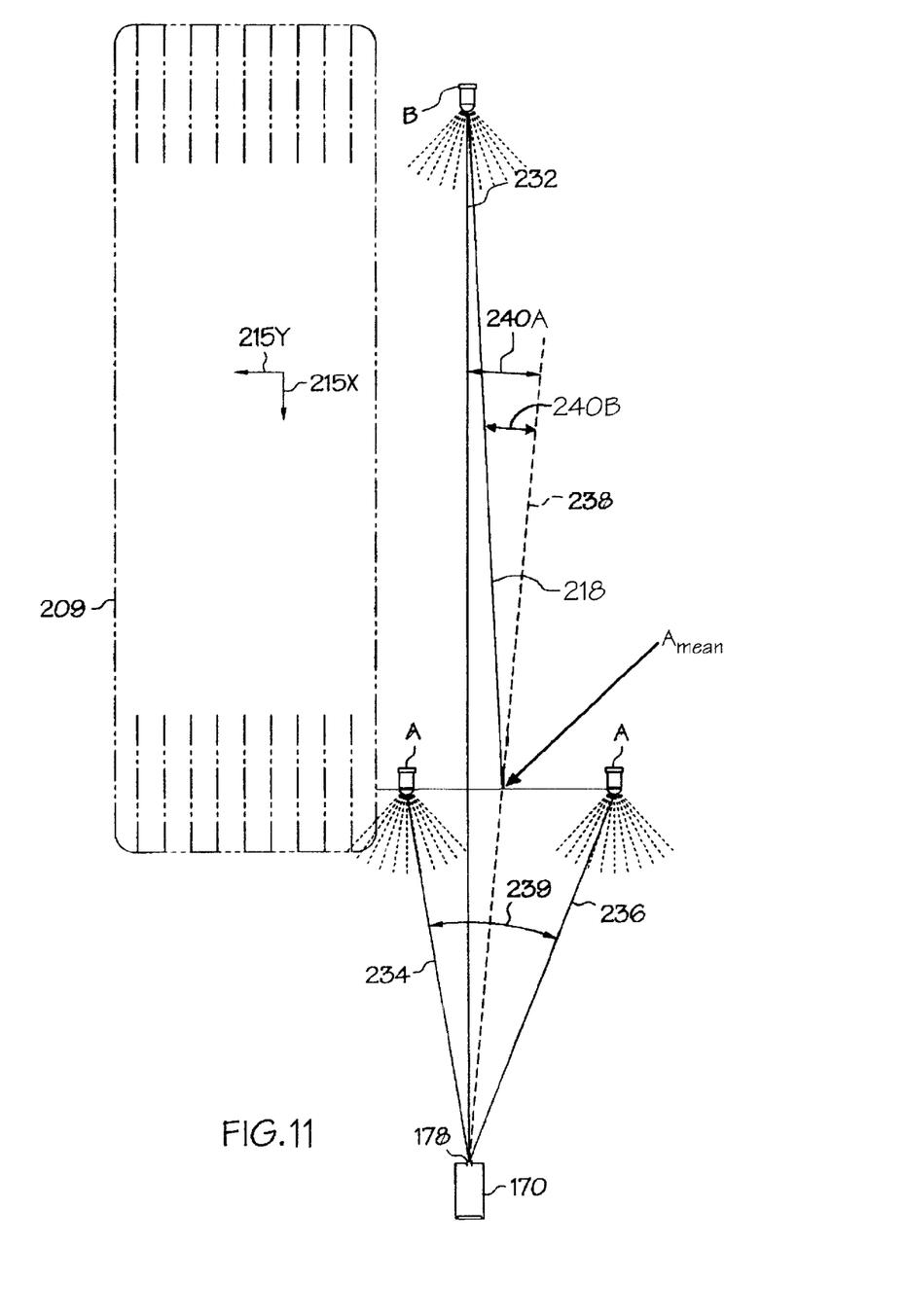
FIG. 11 is a schematic top view of the system of FIG. 6 depicting the relevant lines of sight and angles to be determined from the detector's and emitters's relative positions when measuring longitudinal toe.

Knowing this information, i.e. angle 240A, and measuring (or using a constant assumed value) the distance from the detector to emitters A—A together with the known geometric relationship of emitters A—A and B, angle 240B can be calculated using any of a variety of well-known trigonometric techniques. For example, turning to FIG. 11, the distance from emitter B to $A_{mean}$ (the midpoint between emitters A—A) along line segment 218 is denoted $D_1$, and is fixed at a predetermined distance by the design of the sensor. The distance from the aperture 178 to $A_{mean}$ along line segment 238 is denoted $D_2$, and is determined electronically using conventional distance measurement techniques, or is assumed to be a fixed distance (i.e. when the wheel base of a vehicle to which the sensors are mounted is known). Using conventional trigonometric techniques, such as the Law of Sines, angle 240B is calculated as follows:

$$240_B = 240_A + \sin^{-1}\left(\frac{D_2}{D_1}\sin 240_A\right)$$

Angle 240B represents the longitudinal toe of the rear wheel 209 relative to the line of sight 238 from the front wheel 207.

Once the front and rear longitudinal toe values have been determined, total four wheel toe alignment geometry of the vehicle can be determined with the addition of transverse toe values obtained in a similar manner, or in a conventional manner. The present invention may be utilized to measure the relative transverse toe angle between pairs of front or rear wheels in a similar fashion, by suitably positioning an detector assembly 211 and an emitter assembly 213 on the front or rear wheels of a vehicle such that the detector assembly 211 can view the emitter assembly 213. In such a configuration, the longitudinal axis 218 of the emitter assembly 213 is transverse to the longitudinal axis of the vehicle, along the 215Y axis.

Two suitable alternate configuration for measuring transverse front toe values using an emitter array and a detector in combination with traditional wheel alignment sensors are as follows:

| EMITTER LOCATION | DETECTOR LOCATION | MEASURED ANGLE |
|---|---|---|
| Right front toe arm | Left front toe arm | Left cross LC |
| RIGHT front toe arm* | LEFT front toe arm* | Right cross RC |
| Left rear wheel | Left front wheel | Left front longitudinal LF |
| Right rear wheel | Right front wheel | Right front longitudinal RF |
| Left front wheel | Left rear wheel | Left rear longitudinal LR |
| Right front wheel | Right rear wheel | Right rear longitudinal RR |

*Denotes changes from the conventional prior art system described above.

and:

| EMITTER LOCATION | DETECTOR LOCATION | MEASURED ANGLE |
|---|---|---|
| LEFT front toe arm* | RIGHT front toe arm* | Left cross LC |
| Left front toe arm | Right front toe arm | Right cross RC |
| Left rear wheel | Left front wheel | Left front longitudinal LF |
| Right rear wheel | Right front wheel | Right front longitudinal RF |

-continued

| EMITTER LOCATION | DETECTOR LOCATION | MEASURED ANGLE |
|---|---|---|
| Left front wheel | Left rear wheel | Left rear longitudinal LR |
| Right front wheel | Right rear wheel | Right rear longitudinal RR |

*Denotes changes from the conventional prior art system described above.

Similarly, longitudinal toe values may alternatively be measured on both sides of the car using a pair of emitter arrays and a pair of traditional sensors as follows:

| EMITTER LOCATION | DETECTOR LOCATION | MEASURED ANGLE |
|---|---|---|
| Right front toe arm | Left front toe arm | Left cross LC |
| Left front toe arm | Right front toe arm | Right cross RC |
| Left FRONT wheel* | Left REAR wheel* | Left front longitudinal LF |
| Right FRONT wheel* | Right REAR wheel* | Right front longitudinal RF |
| Left front wheel | Left rear wheel | Left rear longitudinal LR |
| Right front wheel | Right rear wheel | Right rear longitudinal RR |

*Denotes changes from the conventional prior art system described above.

Figure 12:
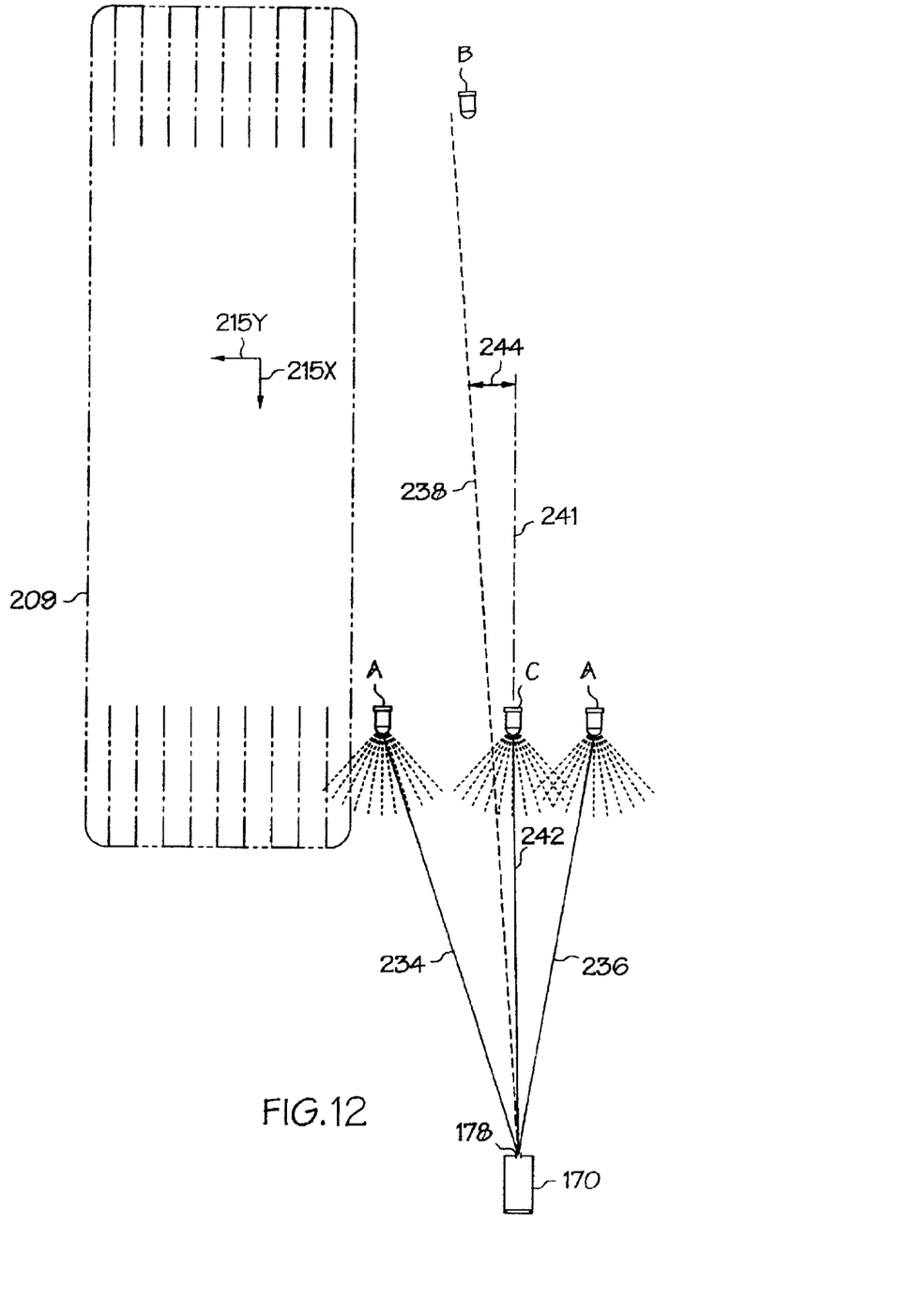
FIG. 12 is a schematic top view of the system of FIG. 6 depicting the relevant lines of sight and angle to be determined from the detector's and emitters' relative positions when measuring camber.
Figure 14A:
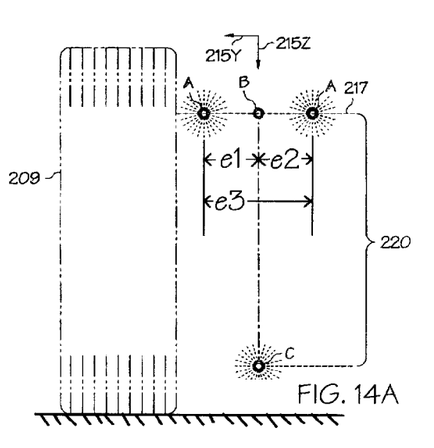
FIGS. 14A through 14C are views similar to FIG. 8, which illustrate the apparent displacement of the emitters as seen along a detector's line of sight ad different camber angles for the wheel to which the emitters are mounted.
Figure 14B:
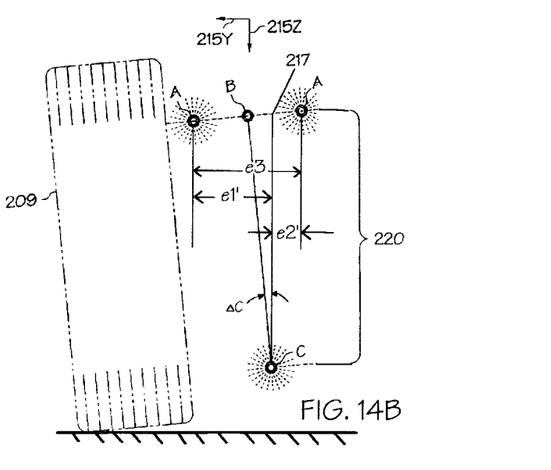
Figure 14C:
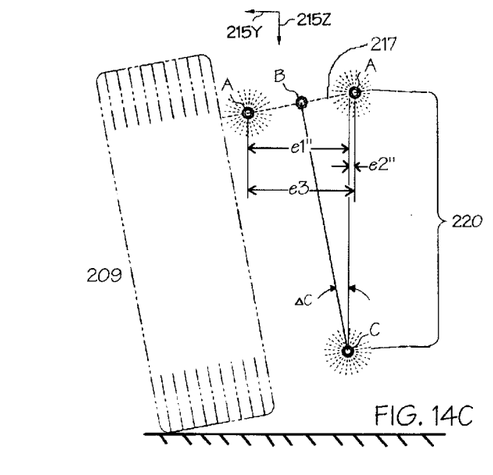

Referring to FIGS. 12 and 14A through 14C, the present invention may be further utilized to measure the relative camber between two adjacent sensor assemblies. Though the sensor assembly 211 is only capable of measuring angles in its horizontal plane, the relative horizontal positions of emitters pair A—A and C can be utilized to determine the camber of the emitter sensor assembly 213 relative to the sensor assembly 211. Specifically, as shown in FIGS. 14A through 14C, the ratio of the apparent horizontal separation between the left emitter A and the emitter C, denoted e1, e1' and e1", respectively, and the apparent horizontal separation between the right emitter A and the emitter C, denoted e2, e2', and e2", varies in a trigonometric (i.e. mathematical) relationship to the relative camber angle of the emitter sensor assembly 213. The detector 170 located on sensor assembly 211 is configured to observe the apparent horizontal distances e1, e2, and the entire A—A apparent separation e3. Utilizing the observed e1 and e2 measurements, as well as the apparent separation distance e3, together with any of a variety of conventional trigonometric techniques, the relative camber angle $\Delta C$ of the emitter sensor assembly 213 can be computed. For example, as seen in FIGS. 12–14, the distance e3, between emitters A—A is known, as is the vertical separation distance 220. Measured angles include the angle subtended by distance e1, denoted 244B, and the angle subtended by the distance e3, denoted 244C, as seen by the detector 170. For small angles such as those associated with vehicle wheel alignment, the ratio of 244C to 244B may be approximated by the ratio of e3 to e1. Hence, the relative camber angle, $\Delta C$, can be expressed as:

$$\Delta C = \sin^{-1}\left(\frac{e1 - \frac{e3}{2}}{(220)}\right) = \sin^{-1}\left(\frac{e3\left(\frac{(244B)}{(244C)}\right) - \frac{e3}{2}}{(220)}\right)$$

Knowing the relative camber angle $\Delta C$, it can then be compared to the camber angle of the front sensors assembly 211 (which has been measured by conventional means such as a gravity-referenced camber transducer) and the true camber value of the rear sensors determined. For example, if the sensor assembly 211 measures a camber transducer angle of 2.0 degrees, and observes a relative camber $\Delta C$ measurement of 2.0 degrees for the rear sensor assembly 213 by observing the emitters, the actual rear camber measurement for the rear sensor assembly 213 is the sum of the two angles, i.e. 4.0 degrees.

Many variations on this scheme could be used. For example, the passive and active transducers could be switched between sensors or wheels as shown above. Additional linear detectors configured to sense the apparent vertical distances between the emitters A—A, B, and C mounted to an opposed sensor may be added, resulting in the ability to check sensor level and caster adjust, or to measure SAI. Those of ordinary skill in the art will recognize that the specific orientations of the emitters and detectors need not be limited to horizontal and vertical orientations, so long as the emitters and detectors are mounted in known spatial configurations, such that apparent separation distances may be observed.

Turning to FIGS. 9 and 10, it is seen that an alternate embodiment of the present system functions where the angle measuring (active) detectors, such optical benches 170 (one for each side of the vehicle) receiving admitted light 179, are not mounted to the wheels of the vehicle but is instead mounted apart from the vehicle. In FIGS. 9 and 10, the view is along the axis 215z (top), with the axes 215y and 215z disposed as shown. An array of emitters 213 would then be mounted to each wheel 225 and the positions and orientations of the wheels determined by observing the apparent horizontal separation distances of the A—A, B, and C emitters for each of the vehicle wheels, as described above, to determine relative toe and camber angles for each wheel. It will be noted, that as shown in FIG. 10, each array of emitters 213 is preferably mounted to the associated vehicle wheels such that emitter B is located on the opposite side of the pair of emitters A—A along the line of sight from the observing detector or optical bench 170. Those of ordinary skill in the art will recognize that alternative mountings for the array of emitters 213 may be employed, so long as the spatial geometry of emitters A—A, B, and C is known. The detectors 170 on each side of the vehicle, as shown, or even a single detector shifted from side to side (not depicted), could make all the necessary determinations of the toe and camber alignment angles of the wheels 225 from the observations of the apparent horizontal distances between the emitters A—A, B, and C in each array 213. The addition of a linear detector configured to observe apparent vertical separation between the emitters A—A, and B, associated with each of the vehicle wheels further provides the ability to check sensor level, caster adjust, or to measure SAI.

In an alternate embodiment, the system of the present invention may be utilized in conjunction with conventional angle transducers to provide a redundant calibration measurement. In such a system, each sensor assembly includes not only the traditional means of measuring toe and camber, but also the passive array of emitters disclosed and discussed above. The traditional measurements and the active/passive measurements discussed above can be compared with each other to determine not only whether the total system of four sensor assemblies is in calibration, but also to determine which sensor assembly, if any, is out of calibration. In addition, these calibration checks are able to check both toe and camber calibration, which is not the case with many prior calibration checking systems. Camber measurements made in the above-described manner could also provide a method of verifying camber measurements made by more conventional means, such as a gravity-referenced inclinometer. Averaging redundant measurements could result in more fault tolerant systems.

Passive sensors of the sort described above could further be used for determining frame angle and providing frame reference when performing truck alignment. Although it is contemplated that LED and laser diode emitters and/or linear CCD detectors would be used in the present system, they could be replaced by other devices serving the same purposes, e.g., retro-reflectors.

The position and number of emitters used to make the toe measurement is not critical except that there must be at least two emitters and the relative positions of the emitters known (or discernible) and positioned such that they provide adequate movement, i.e. front-to-back separation between emitters for the determination of toe and top-to-bottom separation for the determination of camber, to provide suitable horizontal measurements.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A wheel alignment sensor system comprising:
   a first sensor assembly for mounting to a first wheel of a vehicle whose alignment is to be measured;
   a second sensor assembly for mounting in a known geometrical relationship to a wheel of a vehicle whose alignment is to be measured, said second sensor assembly having at least a pair of emitters in fixed geometrical relationship with respect to each other; and
   said first sensor assembly having at least one detector, said detector being capable of observing an apparent geometrical relationship of said pair of emitters indicative of an alignment angle of said second wheel.

2. The vehicle alignment sensor system as set forth in claim 1 wherein:
   said first sensor assembly is configured to measure at least a first angle with respect to a fixed reference; and
   whereby a true alignment angle of said second wheel is determinable from said first angle and said alignment angle of said second wheel indicated by said observed apparent geometrical relationship.

3. The vehicle alignment sensor system as set forth in claim 1 wherein said pair of emitters is disposed in an orientation such that a variation in said apparent geometrical relationship from said known geometric relationship of said pair of emitters is mathematically related to a toe angle of said second wheel.

4. The vehicle alignment sensor system as set forth in claim 3 wherein in said variation in said apparent geometrical relationship is a horizontal variation.

5. The vehicle alignment sensor system as set forth in claim 2 wherein said first angle measured by the first sensor assembly is a camber angle, said alignment angle of said second wheel is a camber angle, and wherein said true alignment angle of said second wheel is a camber angle.

6. The vehicle alignment sensor system as set forth in claim 1 wherein said detector is configured to detect horizontal positions of said emitters.

7. The vehicle alignment sensor system as set forth in claim 6 wherein said detector is a linear sensor.

8. The vehicle alignment sensor system as set forth in claim 1 wherein said pair of emitters have a common axis substantially perpendicular to an outer face of said wheel, and wherein said second sensor assembly includes at least a third emitter displaced from said common axis of said pair of emitters.

9. The vehicle alignment sensor system as set forth in claim 8 wherein said third emitter is displaced horizontally from a midpoint between said pair of emitters.

10. The vehicle alignment sensor system as set forth in claim 8 wherein said third emitter is displaced vertically from a midpoint between said pair of emitters.

11. The vehicle alignment sensor system as set forth in claim 8 wherein said pair of emitters and said third emitter are disposed in an orientation such that variations in said apparent geometrical relationships, from said known geometric relationships of said pair of emitters and said third emitter, are mathematically related to a camber angle of said second wheel.

12. The vehicle alignment sensor system as set forth in claim 8 wherein said pair of emitters and said third emitter are disposed in an orientation such that variations in said apparent geometrical relationships, from said known geometric relationships of said pair of emitters and said third emitter, are mathematically related to a toe angle of said second wheel.

13. A method of determining vehicle alignment angle for a wheel of a vehicle comprising:
   mounting, at a first wheel of a vehicle, a detector;
   mounting at least a pair of emitters in known geometrical relationship with respect to each other on an adjacent wheel of said vehicle; and
   observing with said detector on said first wheel, the apparent geometrical relationship of said pair of emitters to determine an alignment angle for said adjacent wheel of said vehicle.

14. The method of determining a vehicle alignment angle as set forth in claim 13 wherein said alignment angle is a toe angle and said pair of emitters are disposed in an orientation such that a variation in said apparent geometrical relationship from said known geometric relationship of said pair of emitters is mathematically related to a toe angle of said adjacent wheel.

15. The method of determining vehicle alignment angles as set forth in claim 14 wherein said variation in said apparent geometrical relationship is a horizontal variation.

16. The method of determining vehicle alignment angles as set forth in claim 13 further including disposing a third emitter in a known orientation with respect to said pair of emitters such that a variation in said apparent geometrical relationships from said known geometric relationship of said pair of emitters and said third emitter is mathematically related to a camber angle of said second wheel.

17. The method of determining vehicle alignment angles as set forth in claim 16 wherein said variation in said apparent geometrical relationship is a horizontal variation.

18. A method of determining vehicle alignment angles comprising:
   measuring at a first wheel a first camber alignment angle of a vehicle whose alignment is to be measured;
   mounting at least a pair of emitters in fixed geometrical relationship with respect to each other on a second wheel of said vehicle, wherein said pair of emitters are in fixed geometrical relationship with respect to said second wheel and said second wheel is longitudinally displaced from said first wheel on the same side of said vehicle;
   measuring with a detector mounted on said first wheel the apparent geometrical relationship of said pair of emitters to determine a relative camber angle of said second wheel, and determining a true camber angle of said second wheel from said first camber angle and from said relative camber angle.

19. The method of determining vehicle alignment angles are set forth in claim 18 wherein said pair of emitters are disposed in an orientation such that a detected horizontal separation of said pair of emitters provides an apparent geometrical relationships which is an indication of said true camber angle of said second wheel relative to said first camber angle.

20. In a vehicle wheel alignment system, a vehicle wheel alignment indicator comprising:

a housing configured for attachment to a vehicle wheel clamp, said housing having an axis of rotation;

a pair of radiation emitters mounted in a known, fixed relationship to said housing, said pair of radiation emitters disposed along an axis parallel to said axis of rotation of said housing;

a third radiation emitter mounted in a known, fixed relationship to said housing, said third radiation emitter perpendicularly disposed perpendicular to said axis of rotation of said housing, opposite said axis of said pair of radiation emitters, said third radiation emitter and said pair of radiation emitters defining a substantially horizontal plane;

a fourth radiation emitter mounted in a known, fixed relationship to said housing, said fourth radiation emitter perpendicularly disposed from said substantially horizontal plane defined by said pair of radiation emitters and said third radiation emitter, said fourth radiation emitter and said pair of radiation emitters defining a substantially vertical plane.

21. In a vehicle wheel alignment system, a cooperative pair of vehicle wheel alignment sensors comprising:

a first sensor for attachment to a first vehicle wheel, said first sensor including a radiation detector configured to observe incident radiation;

a second sensor for attachment to a second vehicle wheel adjacent said first vehicle wheel, said second sensor including at least two radiation emitters in a known geometric configuration;

wherein said radiation detector is configured to measure an alignment angle for said first vehicle wheel by observing incident radiation from at least one said at least two radiation emitters on said second vehicle wheel, and an alignment angle for said second vehicle wheel by observing incident radiation from at least two of said at least two radiation emitters.

22. A method of checking calibration of an apparatus for determining camber of a vehicle wheel comprising:

employing a conventional device to measure the camber of said vehicle wheel;

mounting at least a pair of emitters in a fixed geometrical relationship with respect to each other on said vehicle wheel, wherein said pair of emitters are in fixed geometrical relationship with respect to said vehicle wheel and said pair of emitters are at different vertical positions whereby at least one emitter is a lower emitter and at least one emitter is an upper emitter and the geometrical relationships of said emitters to each other, including their relative horizontal and vertical displacements, are known;

observing with a detector, which is not mounted in fixed geometrical relationship with said vehicle wheel, the apparent horizontal displacement of said upper emitter and said lower emitter, wherein said detector is at a known vertical inclination;

determining the camber of said vehicle wheel from said known horizontal displacements of said emitters, from said known detector vertical inclination and from said observed apparent horizontal displacements of said upper emitter and said lower emitter; and comparing said conventionally measured camber of said vehicle wheel to said detector determined camber of said vehicle wheel to ascertain the calibration accuracy of said conventional camber measuring device.

23. The method of checking calibration of claim 22 wherein said conventional camber measuring device includes a gravity-referenced inclinometer.

24. The method of checking calibration of claim 22 wherein said conventional camber measuring device includes an optical target and an optical imaging system.

25. A method of checking calibration of an apparatus for determining alignment of vehicle wheels comprising:

employing a conventional device to measure the toe angle of a vehicle wheel;

mounting at least a pair of emitters in a fixed geometrical relationship with respect to each other on said vehicle wheel, wherein said pair of emitters are in fixed geometrical relationship with respect to said vehicle wheel and said pair of emitters are at different horizontal positions relative to a plane parallel to the face of said vehicle wheel, whereby at least one emitter is a front emitter and at least one emitter is a rear emitter and the geometrical relationships of said emitters to each other, including their relative horizontal and vertical displacements, are known;

measuring with a detector which is not mounted in fixed geometrical relationship with said vehicle wheel the apparent horizontal displacement of said front emitter and said rear emitter along a line of sight to said detector, and determining the toe angle of said vehicle wheel from said known horizontal and vertical displacements of said emitters, and from said detector measured apparent horizontal displacement of said front emitter and rear emitter;

and comparing said conventionally measured toe angle of said vehicle wheel to said detector determined toe angle of said vehicle wheel to ascertain the calibration accuracy of said conventional toe angle measuring device.

* * * * *